Fig. 1.

T. W. ROACH.
SHINGLE MACHINE.
APPLICATION FILED DEC. 22, 1915.

1,210,208.

Patented Dec. 26, 1916.
8 SHEETS—SHEET 3.

WITNESSES

INVENTOR
T. W. Roach
BY
ATTORNEYS

T. W. ROACH.
SHINGLE MACHINE.
APPLICATION FILED DEC. 22, 1915.

1,210,208.

Patented Dec. 26, 1916.
8 SHEETS—SHEET 4.

T. W. ROACH.
SHINGLE MACHINE.
APPLICATION FILED DEC. 22, 1915.

1,210,208.

Patented Dec. 26, 1916.
8 SHEETS—SHEET 6.

T. W. ROACH.
SHINGLE MACHINE.
APPLICATION FILED DEC. 22, 1915.

1,210,208.

Patented Dec. 26, 1916.
8 SHEETS—SHEET 8.

WITNESSES

INVENTOR
T. W. Roach
BY
ATTORNEYS

UNITED STATES PATENT OFFICE.

THOMAS WILEY ROACH, OF LYMAN, WASHINGTON.

SHINGLE-MACHINE.

1,210,208.      Specification of Letters Patent.     Patented Dec. 26, 1916.

Application filed December 22, 1915. Serial No. 68,170.

*To all whom it may concern:*

Be it known that I, THOMAS W. ROACH, a citizen of the United States, and a resident of Lyman, in the county of Skagit and State of Washington, have invented certain new and useful Improvements in Shingle-Machines, of which the following is a specification.

My invention relates to machines for making shingles, or boxes, and one of the main objects thereof is to provide a rotary carrier provided with a plurality of pockets adapted, each, to receive a block which is presented successively to each of a plurality of band-saws to cut slabs of desired thicknesses therefrom.

A further object is to provide means for automatically tilting the blocks in opposite directions between saws so as to incline the cuts in opposite directions alternately with respect to the ends of the blocks, thereby forming shingles with the butt ends at opposite ends of said blocks alternately.

A further object is to provide means for arbitrarily cutting shingles with their butt ends at the same end of the blocks, as in graining or for other reasons.

A further object is to provide means, arbitrarily operated, for dropping the spalt or waste portion of the block after all possible shingles have been formed from the latter.

A further object is to provide gravity tensioning means for the band-saws, and also to provide guiding means for said saws during the operation of sawing. And further objects are to provide such machines which are simple in construction, automatic in operation, of great capacity, readily adjustable to different conditions or to different results or products, and well adapted to the purposes for which they are designed.

My invention is fully described in the following specification, of which the accompanying drawings form a part, in which like characters refer to like parts in each of the views, and in which:—

In the drawings forming a part of this application I have shown a base 22 on which are the stands 23, 23$^a$, 23$^b$, and 23$^c$, which support the saw arbors 24, 24$^a$, 24$^b$, and 24$^c$, for the band wheels 25, 25$^a$, 25$^b$, 25$^c$, carrying the band saws 26, 26$^a$, 26$^b$, 26$^c$, respectively, arranged radially of the machine and at quadrant points. The base 22 also carries a main frame 27 provided with grooved rollers 28 at desired points carried by slides 29 vertically adjustable in said frame, as by means of a dovetailed slot, and held in adjusted position by means of screws 29$^a$, as is clearly shown in Fig. 14, these rollers 28 carrying a table or carrier 31 having a dependent flange 31$^a$ arranged in the grooves of said rollers, a gear 31$^b$, and a plurality of pockets 31$^c$ for the blocks from which the slabs or shingles are to be cut, shown at 31$^d$, Figs. 3, 9, 14, and 17.

The flange 31$^a$ and the grooves in the rollers 28 may be V-shaped to center the carrier 31 with respect to the base 22, the screws 29$^a$ insuring the proper elevation of the carrier 31 with respect to the planes of the band-saws, suitable jam nuts being provided on the screws 29$^a$ to secure the same in adjusted positions. The gear 31$^b$ is driven by means of a bevel pinion 32 mounted upon a shaft 32$^a$ provided with a pulley 32$^b$ connected with a suitable source of power, said shaft being rotatably mounted in bearings 32$^c$, Fig. 17, upon the frame 27.

Figure 3:
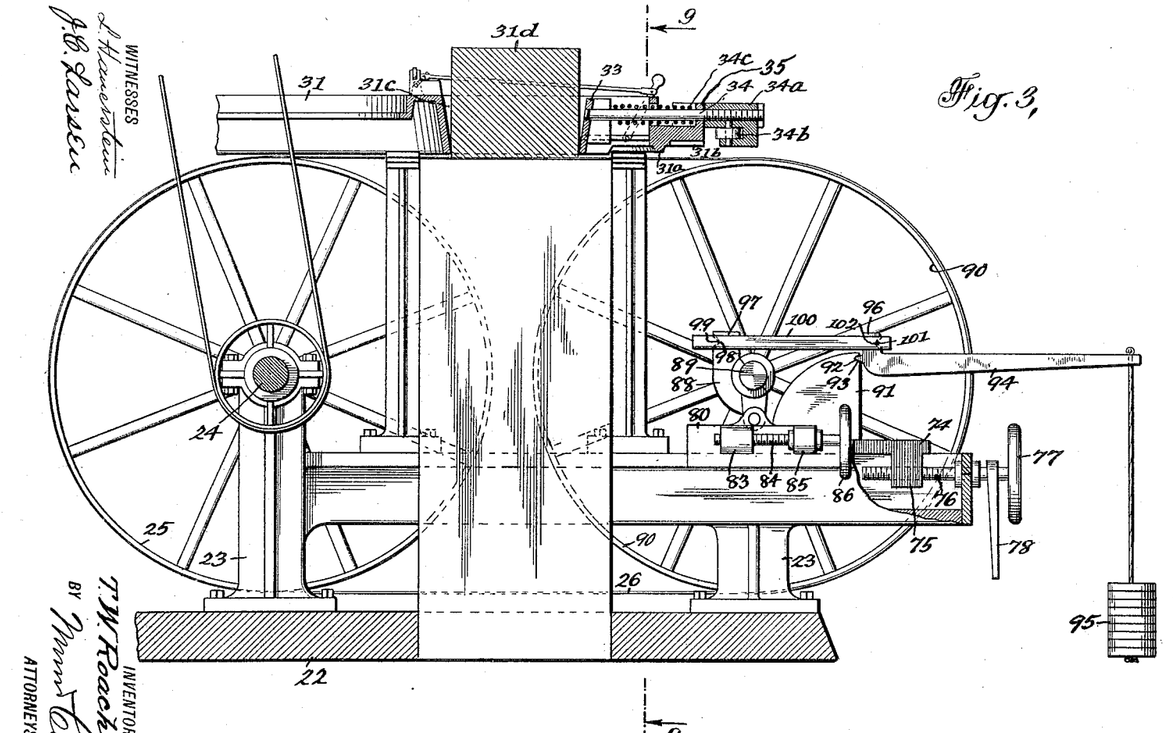
Fig. 3 is an enlarged section taken on the line 3—3 of Fig. 1.
Figures 4, 7, 8:
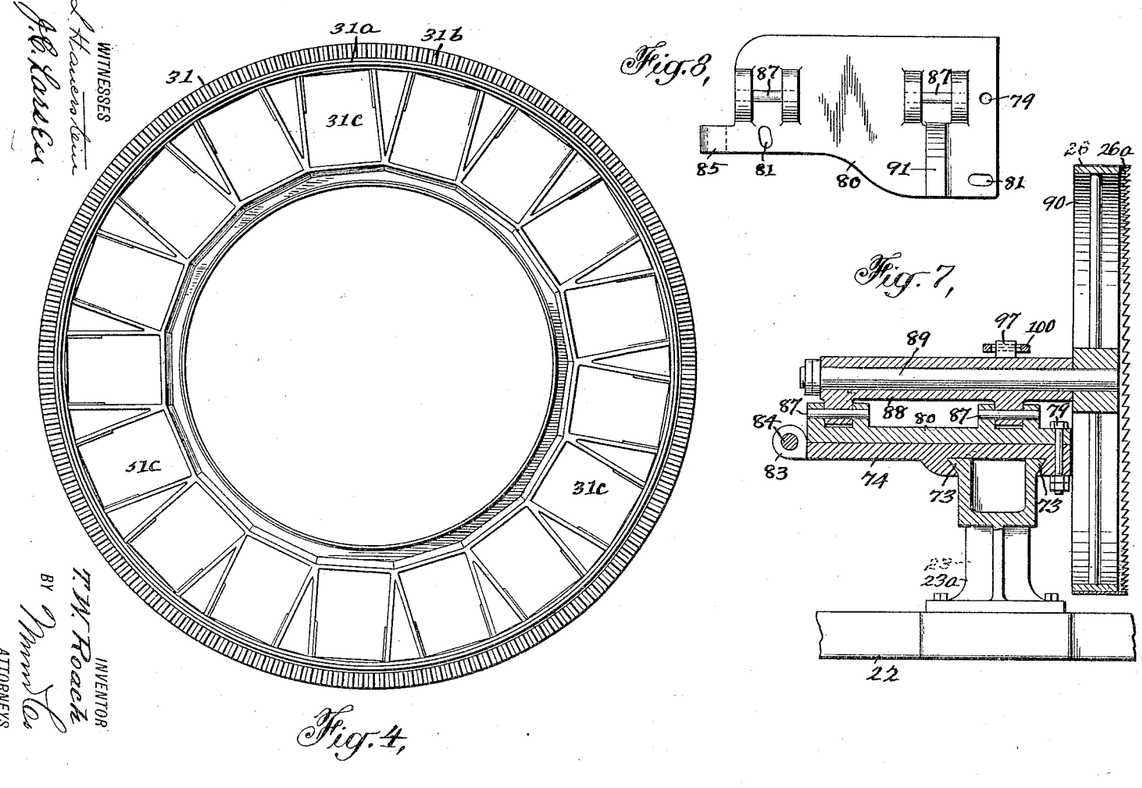
Fig. 4 is a bottom plan view of the carrier detached from the machine.
Fig. 7 is an enlarged section taken on the line 7—7 of Fig. 1.
Fig. 8 is a detached view of a detail shown in Fig. 7.
Figures 9, 10, 11, 12, 13:
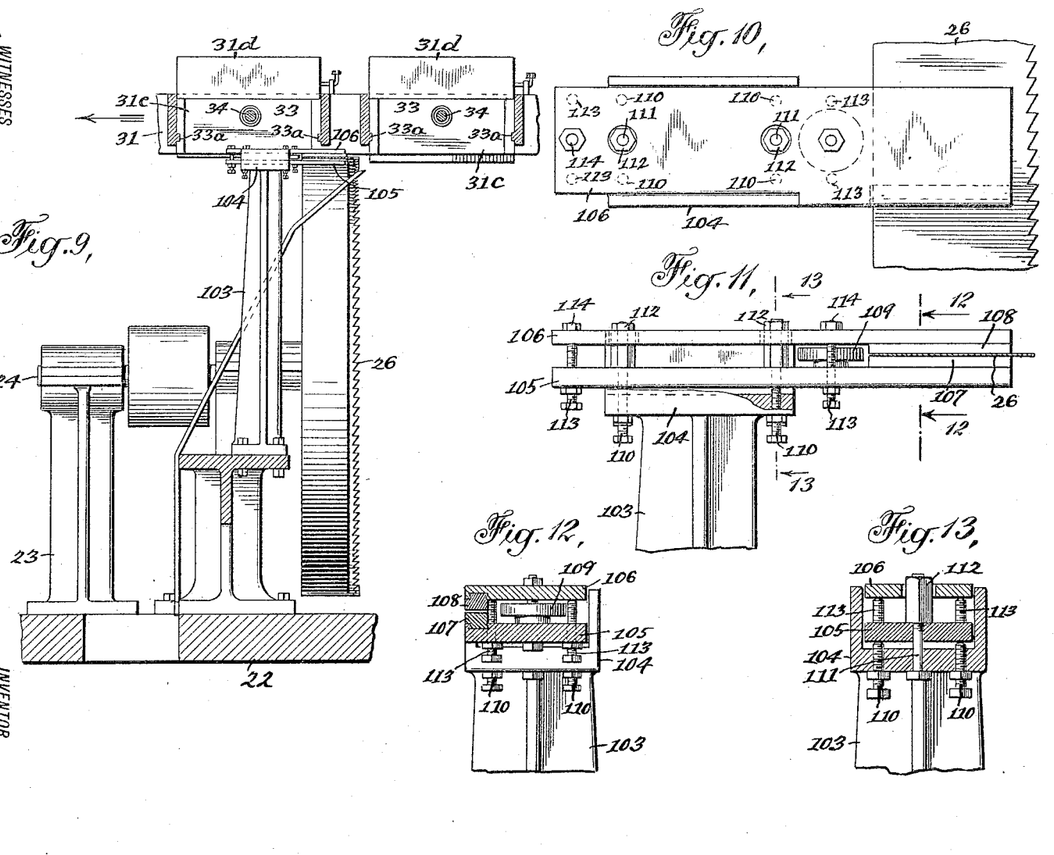
Fig. 9 is a section taken on the line 9—9 of Fig. 3.
Fig. 10 is a fragmentary view in plan of a saw guide which I employ.
Fig. 11 is a side view thereof, partly broken away.
Fig. 12 is a section taken on the line 12—12 of Fig. 11.
Fig. 13 is a section taken on the line 13—13 of Fig. 11.

The pockets 31$^c$ are open at top and bottom and are provided with a head-block 33 each, radially slidable along guides 33$^a$, Fig. 9, and said pockets have their inner and outer walls converging downwardly, as shown in Fig. 3, the respective head-blocks 33 being considered as the outer walls of the compartments or pockets.

Each head-block is provided with a freely slidable though not rotatable bolt 34 which passes through a lug 35 on the table 31 and is screw-threaded into a block 34$^a$ provided with a roller 34$^b$, a coil-spring 34$^c$ being interposed between the head-block 33 and the lug 35 tending to maintain the head-block in its innermost position, though yieldingly, and the lug 35 is also provided with a roller 35$^a$ to serve as an anti-frictional bearing for the block 34$^a$ when moved radially of the table 31 in the manner about to be described.

Figure 1:
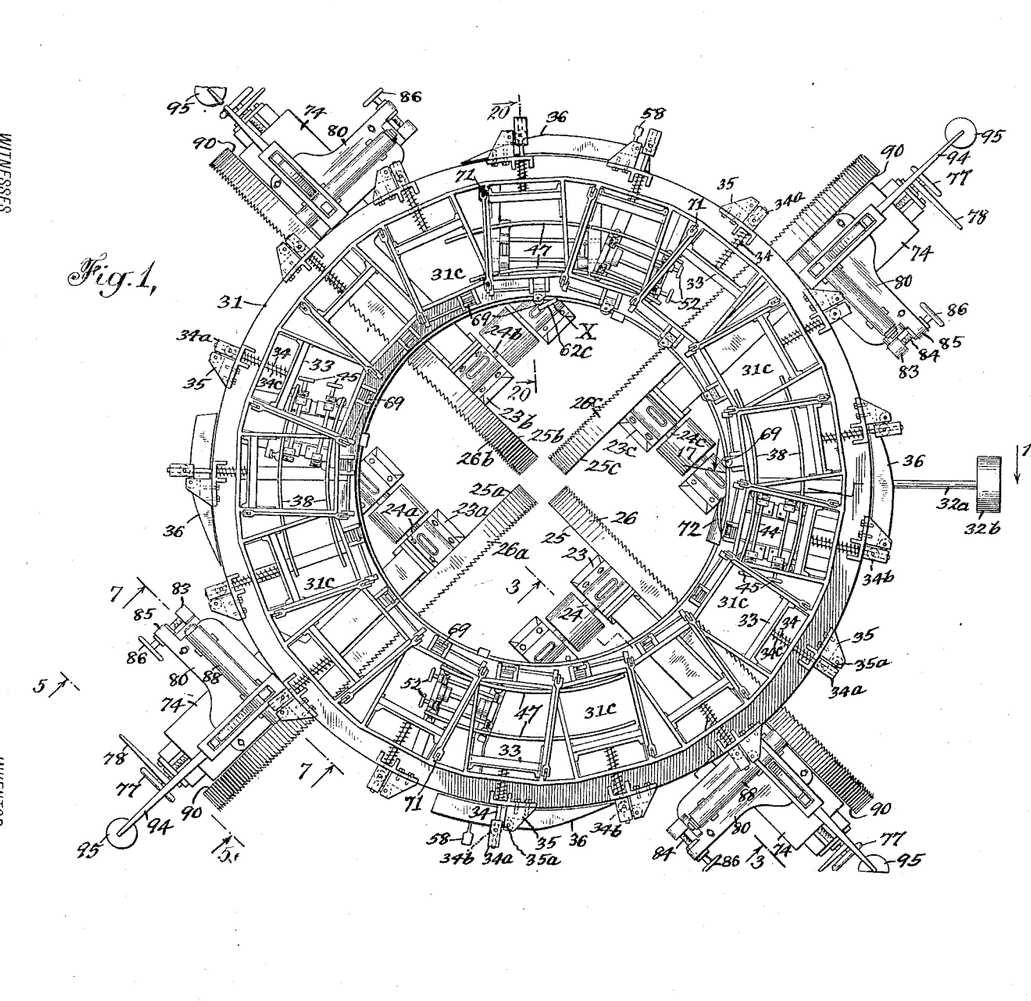
Figure 1 is a plan view of my invention.
Figure 2:
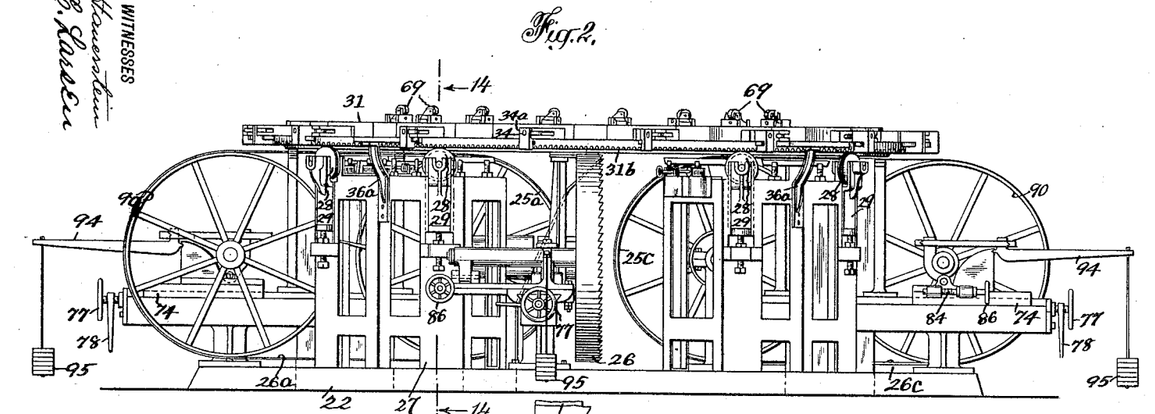
Fig. 2 is a side elevation thereof.

The frame 27 is provided, Fig. 1, with outwardly inclined tracks 36 at desired points, four being shown, in the paths of the rollers 34$^b$ and, when said rollers move over said tracks, the respective head-blocks 33 are drawn outwardly of the table 31 against the action of their springs 34$^c$ until the rollers reach the ends of the tracks at which time said springs return the respective head-blocks to normal positions. When a shingle block 31$^d$ is within a compartment or pocket of the carrier 31 it is normally gripped between the inner wall of the pocket and the respective head-block 33 until the latter is moved outwardly as above described, at which time the head-block is cleared from the shingle block and the latter is free to move downwardly to a supporting surface thereunder to be described and, when the respective roller 34$^b$ passes from the particular track 36 over which it had been moving, the head-block again grips the shingle block but in its new position. These tracks 36 are supported by brackets 36$^a$, Fig. 14, and it will be seen that because of these tracks the shingle blocks are alternately gripped and released at intervals during the revolution of the carrier 31, the tracks equalizing the band-saws in number and being arranged approximately midway of the two adjoining saws whereby, when one saw has acted on the shingle block, the latter is released and again gripped to present a different portion thereof to the next saw.

Figure 14:
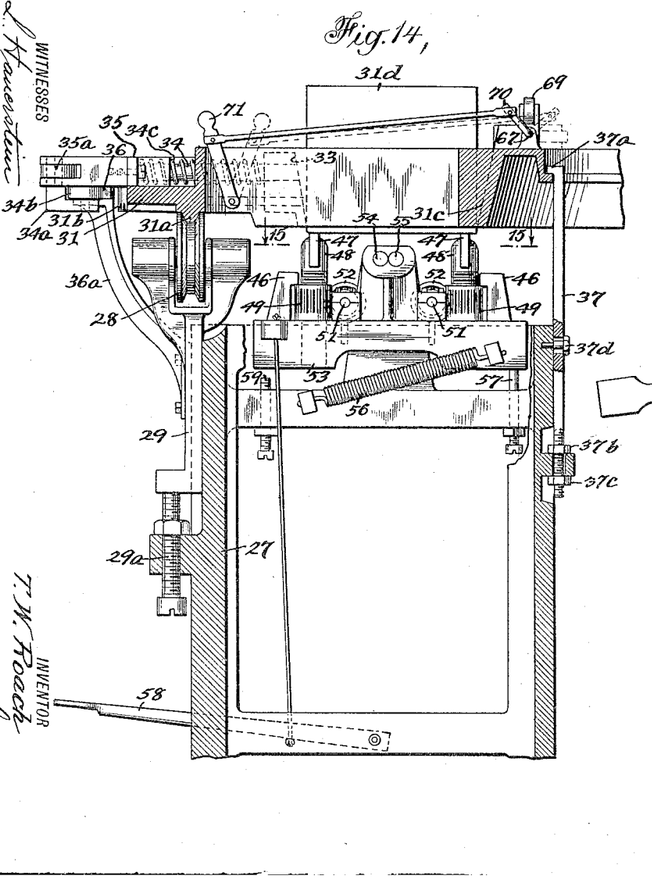
Fig. 14 is an enlarged section taken on the line 14—14 of Fig. 2.

In order to prevent the carrier 31 from tipping I provide a plurality of bars 37, Fig. 14, having a lip 37$^a$, each, projecting over the upper surface of the carrier, said bars being vertically adjustable by means of nuts 37$^b$ and 37$^c$ and being guided in adjustment by means of a bolt 37$^d$.

Figure 15:
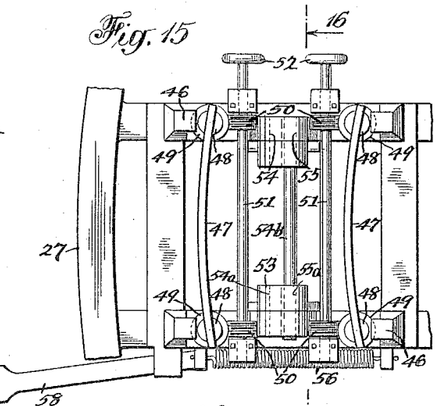
Fig. 15 is a section taken on the line 15—15 of Fig. 14.
Figure 16:
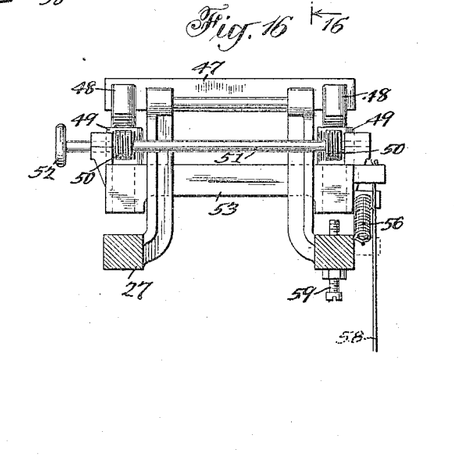
Fig. 16 is a section taken on the line 16—16 of Fig. 15.
Figure 17:
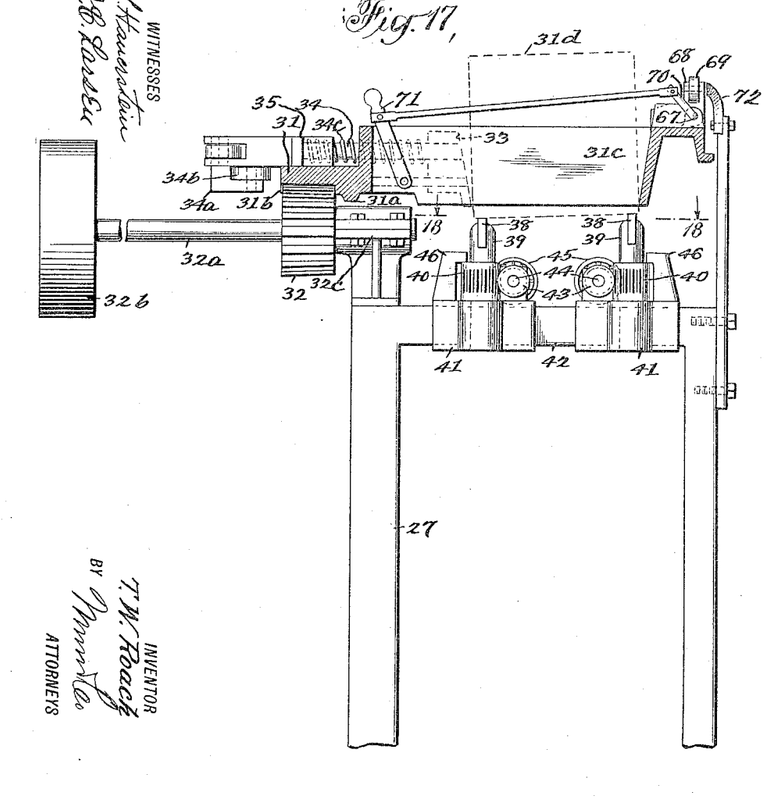
Fig. 17 is a section taken on the line 17—17 of Fig. 1, enlarged.
Figure 18:
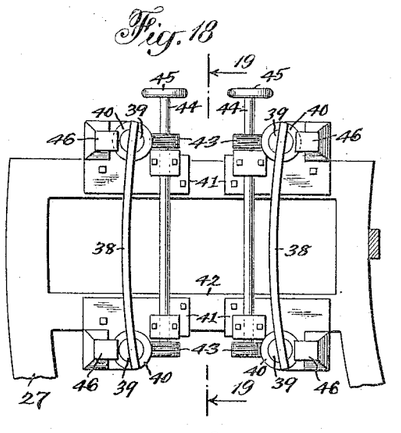
Fig. 18 is a section taken on the line 18—18 of Fig. 17.
Figure 19:
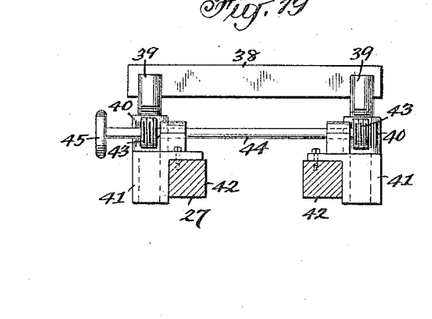
Fig. 19 is a section taken on the line 19—19 of Fig. 18.

The supports for the shingle blocks when released by the head-blocks may be adjustable plates, not shown, but I prefer to make them in the nature of ways arranged concentric with the center of the carrier 31 and in parallelism and of suitable lengths, and I also prefer to provide the same with suitable adjusting means for permanent adjustment for each of two forms, one of which is shown in Figs. 14 to 16, inclusive, and the other of which is shown in Figs. 17 to 19, inclusive, two of each being illustrated as alternately arranged but I may employ all of one form or the other or arrange one of one form in desired relationship with the remainder of the other form.

The form shown in Figs. 17 to 19, inclusive, is of fixed type and comprises the strips 38 arranged in parallelism beneath the path of a shingle block and adapted to jointly support the latter, as indicated in Fig. 17, these strips being carried at the upper ends of posts 39 carried by worm gears 40 into which they are screw-threaded, said gears being in turn rotatably supported on castings 41 slidably mounted upon a member 42 of the frame 27. The gears 40 are enmeshed with worms 43 upon shafts 44 journaled in the respective castings 41 and provided with hand-wheels 45, and it will be seen that when either hand-wheel is rotated the corresponding posts 39 will move vertically, upwardly or downwardly according to the direction of hand-wheel rotation, thereby adjusting the corresponding strip 38 with respect to its mate. I also provide an overhanging member 46 to prevent vertical movement of the gears 40 and it will be seen that when one strip 38 is adjusted in a lower plane than the other, the shingle block will drop into an inclined position when released by its head-block, this inclination being gaged to conform to the desired pitch of the shingles from butt to tip. When I employ all the ways of this form I will alternate the arrangement of the strips 38 in the successive locations by having the outer strip higher than the inner in one location, the outer strip lower than the inner in the next location, and so on, whereby the shingles are successively cut from the block with their butts alternately at opposite ends of the block, thereby reducing waste to a minimum.

The ways shown in Figs. 14 to 16, inclusive, comprise strips 47 carried by posts 48 screw-threaded into worm gears 49 actuated by worms 50 on shafts 51 provided with hand-wheels 52, the gears 49 being rotatably mounted upon a rocking plate 53 pivotally hung at either 54 or 55 and normally maintained in desired position by means of a spring 56 and an adjustable stop 57 but adapted to be rocked by means of a pedal 58 for a distance controlled by a stop 59. The purpose of this rocking frame is to enable the operator to grain the timber or, in other words, to make it possible for him by tilting the frame to cut a shingle with the butt at the opposite end of the shingle block from that at which it would have been cut if the rocking frame had not been tilted.

The different sets of ways are placed in the machine so that in the normal positions the outer strip of one set is higher than the inner strip, the outer strip of the next set is lower than the inner, and so on alternately, whereby the shingles are successively cut with their butt ends at opposite ends of the shingle block; but, whenever desired, the operator may interrupt this normal operation by depressing the pedal 58 to rock the frame 53 and thus cause three successive shingles to be cut with their butts at the same end of the shingle block.

As indicated by dotted lines at 54ª and 55ª the frame 53 is provided with two bores for the pivot rod 54ᵇ and said rod may be passed through such bores and through the pivot bores 54 or 55 whereby the tipping point between the strips comes at the middle of a sixteen inch length of shingle, or at the middle of an eighteen inch length. While I have shown the strips 38 in different horizontal planes to insure the desired pitch to the shingles, I have made no effort to so adjust the strips 47 although these will also be correspondingly adjusted, as will be understood.

Figure 20:
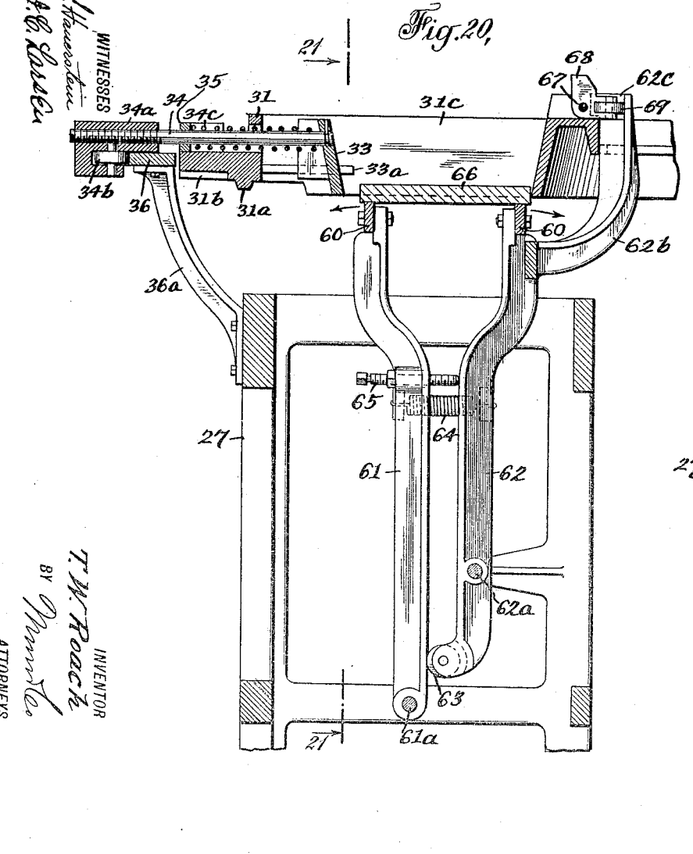
Fig. 20 is an enlarged section taken on the line 20—20 of Fig. 1.
Figure 21:
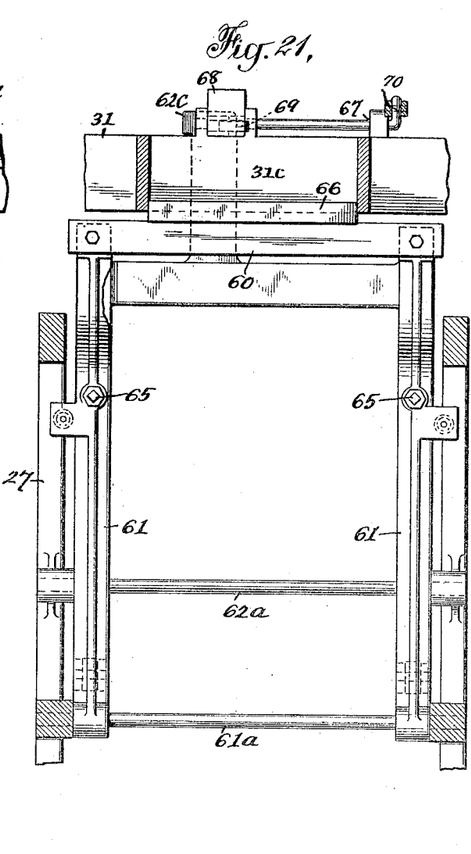
Fig. 21 is a section taken on the line 21—21 of Fig. 20.

At X, Fig. 1, I have shown the location of the shingle block or spalt discharging mechanism shown in detail in Figs. 17, 20 and 21, and which comprises strips 60 carried by uprights 61 and 62, the former being pivoted at 61ª at its lower end to the frame 27 and the latter pivoted at 62ª to said frame at a point intermediate the height of said upright, the lower end of the upright 62 being provided with a roller 63 bearing against the upright 61 and both uprights being normally held toward each other by means of a spring 64, the arrangement shown in Fig. 20 being duplicated at the opposite ends of the strips 60, as shown in Fig. 21.

The upright 62 is provided with an arm 62ᵇ having an upper face 62ᶜ extended over and closely adjacent to the inner periphery of the carrier 31 and at an angle to the plane of the ways or strips 60, and the upright 61 is provided with an adjusting screw 65 to limit the approach of the uprights 61 and 62 toward each other, and thereby spacing the strips 60, and it will be noted that these strips are directly beneath the pockets of the carrier 31 whereby the spalt will be supported by said strips when the respective head-block 33 is released therefrom in the manner already set forth, the spalt being designated 66.

The carrier 31 is provided with means for actuating the above spalt dropping means, one for each pocket, and only one of which will be described in detail. Pivoted at 67 to the inner edge of the carrier and thereover is a rocking plate 68 which carries a roller 69 normally held in vertical position though adapted to be moved into horizontal position by means of a crank 70 and an operating lever 71; when the roller is moved into horizontal position it is in the plane of the inclined face 62ᶜ and forces the upright 62 toward the center of the machine, the roller 63 rocking the upright 61 on its pivot with the result that the strips 60 are forced apart to allow the spalt 66 to fall to the floor or to a suitable receptacle; after the roller 69 has passed the inclined face 62ᶜ the spring 64 returns the strips 60 to normal positions, ready for another shingle block.

As stated, one of the upright actuating means is provided for each of the pockets, though only one set of the said uprights is necessary, and the particular roller 69 which had been moved into horizontal position remains therein until it reaches a re-setting cam 72, Fig. 1, which returns the roller to normal position.

As clearly shown in Figs. 3, 5, 6, 7 and 8, I provide automatically yielding tensioning devices for the band-saws 26, 26ª, etc. and only one of which will be described in detail, that one shown in connection with the stand 23, although all are alike. The upper end of this stand is dovetailed at 73 to engage a similarly formed groove in the under side of a slide 74 movable radially of the machine, or approximately so. This slide, 74, is provided with a dependent lug 75 engaged by a screw 76 rotatably held in the hollow stand 23 and provided with a hand-wheel 77 and, if desired, a ratchet and arm 78 not shown in detail, whereby said slide may be readily adjusted.

Pivoted at 79 to the slide 74 is a plate 80 which may be adjusted with respect to said slide by means of slots 81 and bolts 82, said slide having a lug 83 at one end wherein a screw 84 is screw-threaded, said screw being in rotatable engagement with a lug 85 on the plate 80 and being provided with a hand-wheel 86, rotation of said screw in either direction correspondingly swinging the plate 80 upon its pivot 79.

The plate 80 carries two stub-shafts 87 on the same axis serving as pivotal supports for a bearing 88 for the outer shaft 89 carrying the outer band-wheel 90 for the band-saw 26, and the plate 80 carries an upwardly directed arm 91 having a groove 92 at the upper end thereof adapted to receive the V-shaped nose 93 of a lever 94 carrying weights 95 at its outer end and provided with an upwardly directed member 96 at its inner end.

Figures 5, 6:
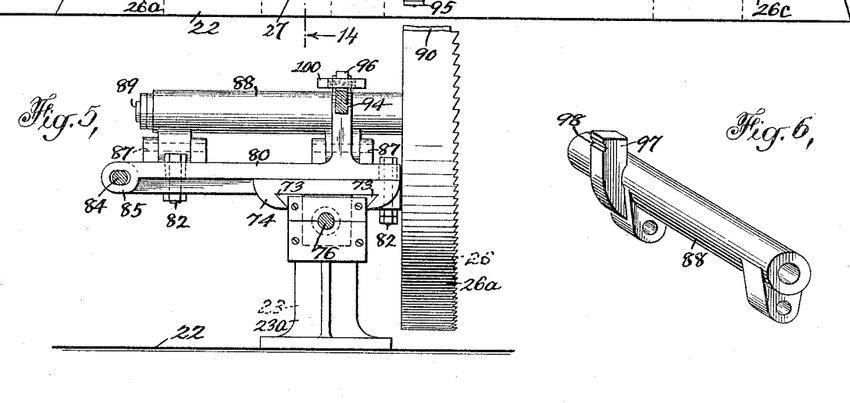
Fig. 5 is a section taken on the line 5—5 of Fig. 1.
Fig. 6 is a view of a detail shown in Fig. 5.

The bearing 88, Figs. 3 and 6, is provided with an upwardly directed lug 97 having a groove 98 adjacent its upper end adapted to receive a pointed projection 99 on the interior end of a link 100, said link having a similar projection 101 at its opposite end for engagement with a groove 102 in the member 96, these being indicated by dotted lines. By means of this arrangement the saw arbor 89 is held outwardly of the machine at a tension determined by the weights 95, though in a yielding manner under strain, and the arbor 89 may be angularly adjusted on the pivot 79 to accommodate the band-saw to its respective band-wheel, and the arbor 89 may be adjusted toward or from the arbor 24 through the medium of the screw 76 at will.

In Figs. 9 to 13, inclusive, I have shown the saw guiding means comprising a post 103 carrying a channeled block 104 for the reception of two horizontally arranged plates 105 and 106 provided with members 107 and 108 bearing upon the respective saw and formed of hardwood, anti-frictional metal, or other suitable material, and I provide a roller 109 between said plates 105 and 106 in line with the saw space between the bearing members 107 and 108.

The block 104 is provided with four set-screws 110 provided with suitable jam-nuts and adapted to adjustably support the plate 105 and which plate is held securely in adjusted position by means of two bolts 111 passed upwardly through the block 104 and the plate 105 and provided with sleeve jam nuts 112 rotatable in suitable openings in the plate 106.

The plate 105 is provided with four upwardly directed set-screws 113 serving as adjustable supports for the plate 106 and which last named plate is held securely in adjusted position by means of bolts 114, suitable jam nuts being provided wherever required.

The saw tensioning means and the saw guiding means are duplicated for each of the saws, and said saws are held in a plane just below the under side of the carrier 31 whereby the shingle blocks are successively carried to each of the saws, and shingles being cut therefrom of an inclination or pitch determined by the relative positions of the sets of ways between the saws. These sets of ways, as stated, are alternated in inclination with respect to each other, whereby the butts of the shingles alternate at opposite block ends, but I may alter this sequence at will by means of the pedal 58, and the operator may drop a block or a spalt at any time by merely throwing the proper lever 71 to carry the respective roller into upright operating position, and which lever and roller are automatically returned to normal positions in due time in the revolution of the carrier 31.

The predominating features of my machine are the arrangement of the saw actuating pulleys within the central portion of the machine; the saw tensioning means; the alternate gripping and releasing of the shingle blocks to move the same into new positions for making new cuts therefrom; the readily adjustable means for determining the pitch of the shingles; the arbitrary means for temporarily overcoming the alternately opposite shingle butts; the means for dropping the spalt or a defective block; the saw guiding means; and the ready adjustability of the parts to meet conditions.

Having fully described my invention, what I claim as new, and desire to secure by Letters Patent, is:—

1. In a shingle machine, a base, a plurality of saws, a rotatable shingle block carrier open at its center and provided with a plurality of shingle block pockets, saw actuating means extended through said open center, and means for rotating said carrier to present a shingle block to each of said saws successively.

2. A shingle machine, comprising a base, a plurality of saws spaced thereon, a rotatable carrier provided with a plurality of pockets open at top and bottom, a head-block guided in each pocket, means for normally holding said head-blocks in inner positions, means for moving the same outwardly of said carrier at intervals, a set of ways arranged between adjacent saws, beneath said carrier, consisting of two tracks arranged in parallelism, supporting posts for the ends of each track, and means for raising or lowering both ends of each track simultaneously and independently of the other track.

In testimony whereof I have signed my name to this specification in the presence of two subscribing witnesses.

THOMAS WILEY ROACH.

Witnesses:
R. W. WEGERT,
EDNA W. WEGERT.

Copies of this patent may be obtained for five cents each, by addressing the "Commissioner of Patents, Washington, D. C."